Oct. 9, 1956  S. SALEM  2,766,164
ADHESION OF SYNTHETIC POLYMERS TO POLYMERIZABLE MATERIALS
Filed March 4, 1954
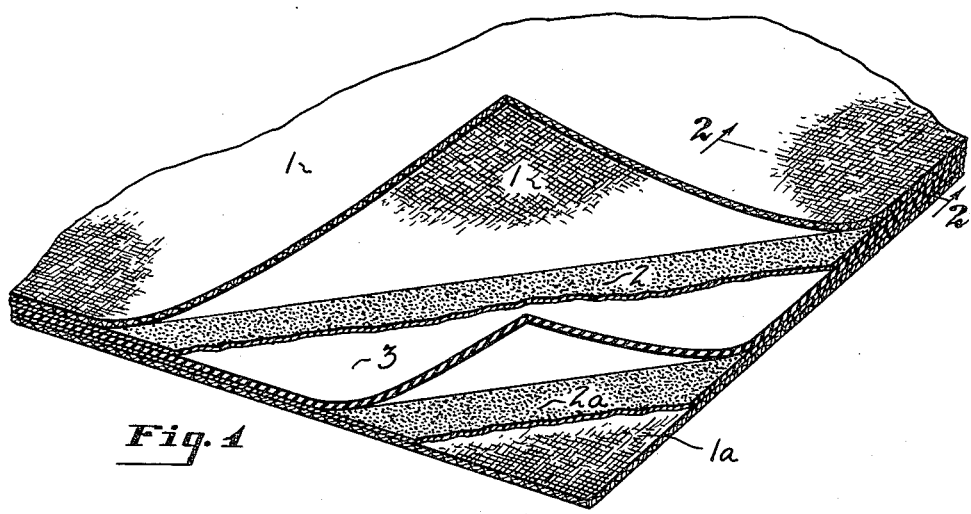
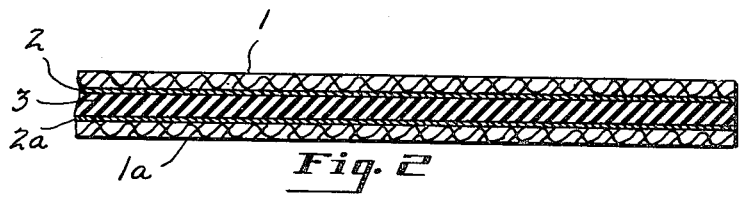
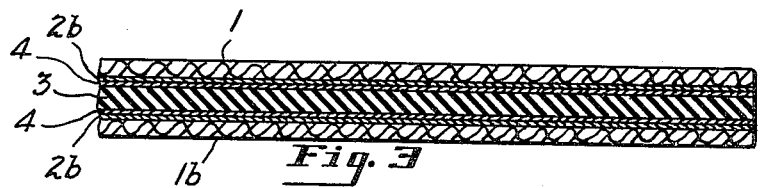
INVENTOR
Samuel Salem
BY Evans + Meloy
ATTORNEYS United States Patent Office 2,766,164
Patented Oct. 9, 1956

2,766,164

ADHESION OF SYNTHETIC POLYMERS TO POLYMERIZABLE MATERIALS

Samuel Salem, Akron, Ohio, assignor to The General Tire and Rubber Company, Akron, Ohio, a corporation of Ohio Application March 4, 1954, Serial No. 414,161

19 Claims. (Cl. 154—139)

This invention relates to a method of adhering synthetic polyamides and polyesters to rubber-like materials. It particularly relates to a method of adhering synthetic linear polyamides and related materials which have been drawn into fibers so as to be laminated about the fiber axis such as is presently sold under the name nylon.

Satisfactory nylon adhesives i. e. for adhesion of rubber to nylon cord fabric, where interlocking of the rubber with tire cords can readily occur, has been obtained by use of the adhesives described in the Mighton Patent No. 2,561,215 of July 17, 1951. In accordance with the process described in the above patent, a nylon cord or fabric is immersed in an aqueous dispersion of a copolymer of a diene hydrocarbon such as butadiene-1,3 or its lower homologues and a member of the group consisting of vinyl pyridine and alkyl substituted mono vinyl pyridines in which copolymer the hydrocarbon is present to the extent of at least 50% and vinyl pyridine is present to the extent of at least 5% of the copolymer. Preferably the aqueous dispersion (latex) of the copolymer also contains a heat convertible resorcinol-formaldehyde condensation product or other polyhydric phenol-formaldehyde resin in amounts of 20% or more of the weight of the copolymer present.

While the adhesion produced by dipping cord fabric in such a material and drying and curing solid rubber in contact therewith is satisfactory for applications where the interlocking of the rubber and fabric is always obtained, it is not satisfactory where cord interlocking is not readily obtainable as in the case of square woven fine fabric or fabric which is not subjected to sufficient pressure to cause the rubber to entirely surround the fabric elements or in the case of a film of synthetic polyamide such as nylon or polyester such as Dacron and the like.

The strong adhesion of nylon to rubber and of Dacron (oriented polyethylene terephthalate) fibers to rubber as well as the adhesion of nylon to nylon through a layer of rubber has been relatively hard to accomplish unless physical interlocking of the rubber with the nylon threads or cords can also occur.

It has been possible by using certain adhesive cements such as the non-aqueous cements having a base of rubber dissolved in solvent and containing large proportions of a polyisocyanate to obtain adhesion up to 5 or 6 lbs. per linear inch or so under most favorable conditions. When the nylon is in the form of a film or is in the form of a fine square woven fabric (as distinguished from nylon cords or cord fabric having large openings of sufficient size for flow of rubber around and between the separate threads) even adhesions of 5 lbs. per linear inch are exceedingly difficult to obtain.

The use of polyisocyanates is based on the theory of chemical bonding of the rubber of the cement to the surface of the nylon. One isocyanate group reacts with a reactive portion of the amine or other grouping in the nylon fiber or film and another reacts with rubber to obtain a chemical linkage through the isocyanate molecule between the rubber and fiber.

The use of rubber cements and latices on the surface of the nylon as well as the use of any amine containing material containing hydroxyl or amine hydrogen in the isocyanate solution has from past experience been deemed to be objectionable because such precoating of the nylon should obviously insulate the fibers so that reaction with isocyanate and a chemical bond between the surface of the fiber and the isocyanate molecule could not be produced. The presence of active hydrogen in the isocyanate solution should destroy the possibility for forming a bond to the surface of the fiber by neutralizing isocyanate groups by prior reaction so there would be nothing for reaction with fiber surfaces. As will hereinafter be seen, superior properties are surprisingly obtained when the fibers are precoated with certain polymeric materials containing pyridine groups and also when polymers containing pyridine groups which should react with isocyanate are present in the isocyanate treating solution.

It is an object of the present invention to provide adhesion of synthetic rubbery materials to nylon type polymers in which interlocking of the rubber and the fabric elements is not essential for good adhesion.

It is another object of the present invention to provide a method of adhering rubber and nylon together or for adhering laminates of nylon together through an interposed layer of cured rubbery polymer wherein one surface of the nylon fabric or film may remain uncovered by rubbery material and still provide a strong bond when attempts are made to separate laminates from each other.

It is another object of the present invention to provide nylon laminates bonded together through a layer of rubbery material wherein the bond has such strength that the rubber will tear within itself rather than separate from the nylon when attempts are made to separate the layers or plies bonded together.

Other objects will be apparent from the following description of the invention as illustrated by the accompanying drawing in which:

Figure 1 is a perspective view of a composite article formed in accordance with the present invention;

Fig. 2 is an enlarged sectional view through a laminated article formed in accordance with the present invention showing the various elements therein; and Fig. 3 is a similar sectional view through a modified form of a laminated article prepared in accordance with the present invention.

I have found that direct adhesion of oriented synthetic linear polyamides and polyesters such as nylon and Dacron which latter is a polyester of ethylene glycol and terephthalic acid having a molecular weight above 10,000 and oriented along the fiber axis by the use of cement containing polyisocyanate is markedly improved by the presence in the cement of substantial amounts of a reinforcing pigment such as carbon black. While cements containing polyisocyanate and prepared by dissolving a rubbery material such as natural rubber in suitable anhydrous solvent have been used in the prior art, we have found in accordance with one aspect of the present invention, that much superior adhesion is obtained when the non-aqueous cement or solution of rubbery polymer contains a substantial amount of carbon black dispersed therein. This is particularly the case when the cement has a base of neoprene, i. e., polymerized polychloroprene or polymers having chloroprene as a major component. I have found that neoprene cement loaded with carbon black and containing polyisocyanates produces much superior adhesion to that obtained with other polymers. By the presence of a carbon black loading of 15% to 60% and preferably at least 20% based upon the chloroprene polymer content of the cement, adhesions to a layer of rubbery polymer such as neoprene cured in contact therewith which are several times as strong as those obtained by other processes by the neoprene and fine square woven nylon have been obtained.

While the highly loaded cements above give adhesion satisfactory for most purposes we have also discovered in accordance with a second aspect of the present invention that superior adhesion is obtained when there is deposited directly on the fabric a copolymer of vinyl pyridine and a diolefinic compound such for example as any of those described in the aforementioned Mighton patent. The copolymer may be in the form of a non-aqueous cement and may contain the polyisocyanate, or the vinyl pyridine polymer may be deposited on the fabric from a latex of the vinyl pyridine copolymer, and a polyisocyanate containing cement of rubbery material such as neoprene or vinyl pyridine-copolymer superimposed thereon.

The strongest bonds that I have been able to obtain are obtained by a process wherein the surface of the film or fabric to be adhered is first coated with an aqueous dispersion of a vinyl-pyridine diolefinic copolymer as described in the aforementioned Mighton patent which preferably contains at least a small amount such as 4 or 5% or so based on the weight of said copolymer of a suitable heat convertible phenol aldehyde resin such as a condensation product of resorcinol and formaldehyde. After drying the thus treated fabric, a solution of a rubbery polymeric material preferably anhydrous neoprene solution containing a relatively small amount based upon the rubbery polymer thereof of a suitable polyisocyanate is superimposed thereon and dried. Soon after drying the thus cemented fabric curable neoprene base compound is calendered or otherwise applied thereon and the layers cured in contact with the aid of heat and pressure. When square woven laminates were made by laminating two finely woven sheets of square woven nylon fabric to an interposed layer of neoprene stock and curing the sheets treated as above in contact with the said neoprene stock at suitable temperature and pressure, adhesions of 70 lbs. per lineal inch have been attained by this process and green uncured building tack has been excellent.

While vinyl-pyridine-diolefin copolymer latex applied on the surface of fabric followed by the treatment with neoprene cement containing polyisocyanates and a layer of neoprene stock has been found to give the highest adhesion that I have yet attained, adhesion within almost the same range has been attained by applying directly on the fabric, a cement, i. e. a solution of such a rubbery copolymer of a conjugated diolefin and vinyl pyridine containing polyisocyanate therein. Such a cement may be made by dissolving in a suitable solvent such as anhydrous hydrocarbon solvents including benzene, toluene, chlorinated hydrocarbon, a coagulum obtained by coagulating a latex of a vinyl-pyridine copolymer in the aforementioned Mighton patent and incorporating a small amount of polyisocyanate.

The treated fabric, having the isocyanate containing cement thereon, is allowed to dry preferably in relatively dry air at a temperature below 135° F. and is then preferably but not necessarily coated with a neoprene base cement containing isocyanate as described above and again dried in air not appreciably above 135° F. The thus coated fabric is thereupon placed in contact with a layer of curable rubber compound, preferably a neoprene base compound and cured with the aid of pressure. While the second coating of cement is preferable and gives somewhat superior adhesion, adhesion intermediate that obtained with a neoprene base isocyanate cement may be obtained without the second cement coating. Thus we have been able to obtain adhesion of 55 lbs. per lineal inch between square woven nylon which was only treated by a cement consisting of a solution of a copolymer of a vinyl pyridine and butadiene containing polyisocyanate before it was placed in contact with a neoprene layer.

The temperature of drying after coating with the non-aqueous isocyanate coated cement is important. The lowest possible drying temperature and shortest drying time should be used.

The polyisocyanate suitable for use in non-aqueous cements in accordance with the present invention comprises any of the organic polyisohyanates i. e. those having 2 or more isocyanate groups per molecule and including the naphthalene diisocyanates, such as naphthalene 1,5 diisocyanate, naphthalene 2,5 diisocyanate and naphthalene triisocyanates, the toluene diisocyanates, methylene bis (4 phenylisocyanate) hereinafter termed MDI, and any other organic polyisocyanate that should become available. The preferred polyisocyanates have at least two isocyanate groups which have substantially equal reactivity. When isocyanate such as toluene diisocyanate is used having one isocyanate group which reacts more rapidly than the other the efficiency of utilization of diisocyanates is somewhat less. The efficiency of triisocyanates having 3 highly reactive isocyanate groups is even greater.

I have found that it is unnecessary to utilize anywhere nearly the amount of polyisocyanate that has been recommended and considered necessary for strongest adhesion in accordance with prior processes using cements containing isocyanates. In order to obtain the relatively low values of adhesion previously obtainable, about 20 parts of polyisocyanate per 100 parts of rubbery polymer in the cement was considered necessary. I have found that excellent adhesion, in fact substantially optimum adhesions, are obtained with no more than 6 parts of polyisocyanate per 100 parts of rubbery polymer in the cement and when more than two isocyanate groups are present as in the case of triisocyanates substantially the same result may be had with no more than 5 parts of the polyisocyanate per 100 parts of polymer in the cement. As little as one-half part of polyisocyanate in the cement or cements gives noticeable improved results in the adhesion in accordance with the present invention although 2% is desirable for most applications where strong adhesion is required and around 5% is preferable. The upper limit of the amount of isocyanate has not been ascertained but is at least above 25% of the weight of the polymeric material in the cement. It has not been ascertained because the isocyanate is an extremely expensive material and it is undesirable to utilize more than is required to obtain optimum adhesion which in the present case is obtained with less than 10% of the polyisocyanate as compared with 20% or more in the substantially gum stock base adhesives recommended and utilized heretofore.

In the preparation of cements into which polyisocyanate is to be incorporated, the solvent should be substantially anhydrous because of the reaction with water. The cements are preferably prepared by first compounding the polymeric material with desired materials such as pigment, curing agents, antioxidants and the like and then dissolving the solid masticated polymer into an anhydrous solvent such as toluene, benzene, xylene or any other suitable organic solvent for the rubbery polymer which solvent should be free of polar groups such as amine hydroxyl, carboxyl etc. or groups capable of reacting with isocyanates.

The conjugated diolefinic compound used for preparing the rubbery copolymers of vinyl pyridine should preferably have less than 7 aliphatic carbon atoms and is preferably a diolefin although copolymerizable diolefinic compounds such as chloroprene 1,3, butadiene 1, 3, cyanoprene, dimethyl butadiene 1,3, isoprene, and the like may be used. The amount of diolefinic compound in the copolymer should ordinarily be 50% or more for best results.

The amount of solvent in the cement is determined by the viscosity desired. Generally a total solids content as high as will permit easy application or drying is preferred. This is usually in the range of 20% to 30% total solids in the case of neoprene and about 10 to 20 percent in the case of natural rubber or diolefin copolymers. The higher the viscosity the thicker the film and the more difficult is the drying. Cements having a total solids content of even less than 5%, say 1 or 2%, may also be used but the deposit is sometimes too thin to provide uniform adhesion.

The following examples in which parts are by weight illustrate the present invention:

*Example I*

A neoprene cement was prepared by first compounding neoprene on a mill according to the following formula:

| | |
|---|---:|
| Neoprene | 94.5 |
| Benzothiazyl disulfide | 2.0 |
| Calcium stearate | 1.0 |
| Phenyl B naphthylamine | 1.9 |
| Semi-reinforcing furnace black | 23.6 |
| Stearic acid | 5.3 |
| Rubber process oil | 8.5 |
| GRS (72%–28% butadiene-styrene copolymer) | 5.5 |
| Sodium acetate | 1.9 |
| Zinc oxide | 4.7 |
| Magnesium oxide | 3.9 |
| | 152.8 |

The neoprene compound above was then dissolved in sufficient solvent to provide a cement having a total solids content of about 20%. Into the cement thus prepared about 6 parts of methylene bis (4-phenyl diisocyanate) was incorporated with stirring. The cement thus prepared was maintained in an air tight container until ready for application.

A fine square woven nylon fabric 1 (see Figs. 1 and 2) is dipped into the cement above prepared or the cement is spread with a suitable doctor blade to provide a coating of cement on the fabric. The spread fabric is thereupon subjected to a blast of cool, dry air until most of the solvent has been evaporated to provide a film 2 on the surface of the fabric. The thus cemented fabric was then calendered with a curable layer 3 of neoprene compound which may be of substantially the same composition as that which was dissolved in order to prepare the cement. The calendering of the fabric was completed in less than 1 hour from the time of spreading in order to prevent deterioration of the isocyanate in the cement coating by moisture in the air.

A second piece of square woven nylon fabric 1a having the isocyanate coating 2a applied thereto as above was then superimposed over the calendered layer and the cemented surface cured against the calendered layer for 15 minutes at a temperature of about 300° F. When attempts were made to separate the fabric strips 1 and 1a as thus prepared it was found that about 40 lbs. per linear inch was required. In addition it was found that the building tack as evidenced by green adhesions of the cemented surface of the fabric to the neoprene layer was excellent.

In the above example the neoprene compound used in preparing this cement may be varied, changing of the particular carbon black, utilization of different anti-oxidants, curing agents and the like as is well known in the art. Similar neoprene compounds used may be varied to solvent utilized in preparing the cement may be increased obtain substantially equivalent results. The amount of and it is particularly desirable to increase the amount of solvent to provide a solids content of about 15% or so when the cement is not to be utilized within 5 to 6 hours time. When it is desirable to dip the fabric in the cement a somewhat lower solids content is preferable and should be used. The lower the solids content the more stable is the cement containing the polyisocyanate. Cements containing 20% solids with 6% of the isocyanate above are stable for only about 6 hours whereas when the total solids is reduced to 15% a stability of about 12–15 hours is had even when the isocyanate is increased to 8% based on the rubbery polymer in the cement present.

The application of the rubbery polymer to the cemented fabric should take place as soon as possible after the cementing has occurred. Strongest adhesions can be obtained when the calendered layer is incorporated immediately after evaporation of the solvent.

After calendering the stock may be stored for extended periods of time as the calendered layer prevents the moisture attacking the isocyanate in the cement before it has interacted with the rubbery material of the calendered layer to form a sponge.

*Example II*

A cement was prepared by dissolving in sufficient toluene to form a solids content of 12%, a masticated compound of the following composition:

| | |
|---|---:|
| Copolymer of 25 parts vinyl pyridine and 75 parts butadiene | 100 |
| SRF black | 25 |
| Zinc oxide | 3 |
| Benzothiazyl disulfide | .6 |
| Stearic acid | 1.5 |
| Calcium stearate | 1.0 |
| Sulfur | 3.0 |
| | 134.1 |

Up to 20 parts of the vinyl pyridine may be replaced by styrene. Six parts (six percent) of methylene bis (4-phenylisocyanate) was stirred into the above cement to form an adhesive which was substituted for the neoprene cement in the previous example to prepare a composite article, other conditions and compounds remaining the same. The adhesion was such as to require a pull of 55 lbs. per linear inch to separate the fabric pieces.

*Example III*

A compounded latex (aqueous dispersion) of the following composition dry solids basis was prepared as described in the aforementioned Mighton patent.

| | |
|---|---:|
| Copolymer of 75% butadiene, 15% of 2 vinyl pyridine and 10% of styrene | 100 |
| Resorcinol | 11 |
| Formaldehyde | 6 |
| Sodium hydroxide | 0.3 |

The latex was diluted with sufficient water to provide a solids content of 20%.

Square woven nylon fabric 1b was dipped into the above latex and dried to form thereover the above base coating 2b (Fig. 3). The dried fabric was thereupon spread with neoprene cement as described in Example 1 to form after drying as above the film 4. Identical pieces of the fabric thus treated were applied to opposite sides of a layer of curable neoprene compound 3 as above described and cured between platens of a pressure of several hundred lbs. per square inch for 10 minutes at 310° F.

The force required to separate the pieces was greater than the strength of the neoprene compound and was 70 lbs. per linear inch.

In the above examples the neoprene compound can be substituted by other rubber compounds including natural rubber but the strength of the bonded fabric is somewhat less.

The isocyanate can be substituted in whole or in part by other organic compounds containing a plurality of isocyanate groups and/or isothiocyanate groups.

The square woven nylon fabric may be substituted by other fibrous material comprising a synthetic linear polymer oriented along the fiber axis and including other orientable linear polyamides and polyesters including the polyester formed by reacting terephthalic acid and a glycol such as ethylene glycol.

I claim:

1. Method of adhering to a rubbery polymer of a diolefinic component a fibrous material comprising a synthetic linear polymer oriented along the fibrous axis which comprises depositing on the surface of said fibrous material a relatively thin coating comprising a copolymer of a conjugated diolefinic compound of less than 7 aliphatic carbon atoms and a vinyl pyridine, drying the coating to remove most of any liquid present, and superimposing on the substantially dried coating a layer of non-aqueous solution of a rubbery polymer of a diolefinic compound having dispersed therein an organic compound having a plurality of isocyanate groups, drying the layer in the substantial absence of moisture to form a film, and curing a layer of a vulcanizable compound of rubbery polymer of a diolefinic compound against the film thus produced.

2. A method of strongly adhering to cured rubber oriented fibers of a synthetic linear polymer selected from the group consisting of polyamides, and esters of terephthalic acid and a glycol, which fibers have deposited thereon a dried layer comprising a copolymer of a conjugated butadiene of less than 7 aliphatic carbon atoms and a vinyl pyridine, said method comprising applying on said dried layer a cement comprising a solution in organic solvent of a curable rubber compound having as a component part thereof a polymer of a conjugated diolefinic compound of less than 7 aliphatic carbon atoms and containing organic compounds having a plurality of groups selected from a member of the group consisting of isocyanate and isothiocyanate, permitting evaporation of major portion of said organic solvent and applying a layer of a curable rubber compound against the dried cement layer and curing said rubber compound in contact therewith.

3. The method of adhering a fibrous material comprising fibers of a member of the group consisting of oriented linear polymers of polyamides, and oriented esters of a polycarboxylic acid and a dihydric alcohol, which comprises applying over a surface portion of said fibers a cement comprising a solution in organic solvent of curable rubbery polymer of diolefinic compound of less than 7 aliphatic carbon atoms containing about 5% to 25% based on the weight of said polymeric material in said cement of an organic compound having a plurality of groups selected from the group consisting of isocyanate and isothiocyanate groups and containing 15% to 60% based on the weight of said polymeric material of carbon black distributed therein, permitting evaporation of solvent from said cement to form a film, preventing contact of moist air therewith and vulcanizing a layer of a curable vulcanizable rubber compound in contact with said film.

4. The method of claim 4 wherein a major portion of polymer in said cement is a polymer of chloroprene.

5. The method of claim 3 wherein the polymer comprises a copolymer of vinyl pyridine and butadiene.

6. The method of claim 3 wherein the amount of isocyanate containing compound is 5% to 10% of weight of the polymeric material in said cement.

7. The method of claim 1 wherein said vulcanizable compound applied against the layer deposited from said non-aqueous solution is principally a chloroprene polymer.

8. The method of claim 1 wherein said diolefinic compound of said copolymer is butadiene.

9. The method of claim 1 wherein the solution of rubbery polymer contains a vinyl pyridine-butadiene copolymer and wherein said layer of vulcanizable compound comprises a polymer of chloroprene and wherein said curing is accomplished with the aid of heat and pressure.

10. The method of claim 2 wherein the said cement comprises a copolymer of a butadiene and 2 vinyl pyridine.

11. A composite article comprising a fabric and a rubber bonded together; and fabric containing fibers of oriented linear polymers selected from the groups consisting of linear polyamides and polyesters, said composite article being further characterized by having in contact with said fabric a relatively thin solid coating deposited from a member selected from the group consisting of solutions and dispersions of a copolymer of a conjugated diolefinic compound and a vinyl pyridine, said coating being bonded to a layer of a cured rubber compound of a rubbery polymer of a diolefinic compound and having at least at the surface portions thereof a residue from the reaction of said copolymer with an organic compound having a plurality of reactive groups selected from isocyanate and isothiocyanate groups.

12. A composite article comprising layers of fabric adhered together through an interposed layer of a cured compounded rubbery polymer of a diolefinic compound, said fabric containing fibers of oriented linear polymers selected from the group consisting of polyamides and polyesters, said article being further characterized by having in contact with each of said layers of said fabric a relatively thin coating desposited from a member selected from the group consisting of solutions and dispersions of a copolymer of a diolefinic compound and vinyl pyridine, said coatings being bonded together to form at least part of said interposed layer of cured compounded rubbery polymer and having at least at the surfaces of said coatings nearest each other the residue from the reaction of said copolymer with an organic compound having a plurality of reactive groups selected from isocyanate and isothiocyanate groups.

13. The product of claim 12 wherein the said coatings are bonded together through at least one separate interposed layer on an in situ cured rubber compound.

14. The product of claim 13 wherein the in situ cured rubber compound is a neoprene base compound.

15. A composite article comprising layers of fabric adhered together through an interposed layer of a cured rubber compound, said fabric containing fibers of oriented linear polymers selected from the group consisting of polyamides and polyesters, said article being further characterized by having in contact with each of said layers of fabric a solid coating deposited from a solution in volatile solvent of a curable polymer of a major proportion of a diolefinic compound of less than 7 aliphatic carbon atoms (including polyisoprene and natural rubber) which solution contains 15% to 60% based on the weight of the said polymer present of carbon black and 5% to 20% of an organic compound containing a plurality of isocyanate groups per molecule, said coatings being bonded together to strongly adhere said layers of fabric to each other therethrough.

16. A product of claim 15 wherein a layer of in situ cured rubber compound is interposed between said coatings to bond said coatings together.

17. The product of claim 15 wherein said coatings on said fabric comprise a substantial portion of neoprene.

18. The product of claim 15 wherein the coating on said fabric comprises a substantial portion of neoprene and wherein the interposed layer between said coatings is a neoprene base compound.

19. A composite article according to claim 12 wherein a second coating which is deposited from a substantially anhydrous solution in a volatile solvent of a polymer of a conjugated diolefinic compound having at least 50% by weight of said diolefinic compound therein and containing 15% to 60% based on the weight of said polymer of carbon black dispersed therein and about 5% to about 20% based on the weight of said polymer of an organic compound containing a plurality of isocyanate groups is disposed in contact with each of the coatings directly on the fabric.

References Cited in the file of this patent

UNITED STATES PATENTS

| | | |
|---|---|---|
| 2,415,839 | Neal et al. | Feb. 18, 1947 |
| 2,417,792 | Verbanc | Mar. 18, 1947 |
| 2,561,215 | Mighton | July 17, 1951 |

FOREIGN PATENTS

| | | |
|---|---|---|
| 119,839 | Australia | Aug. 17, 1944 |

OTHER REFERENCES

Transactions, I. R. I., 'Polyisocyanates in Bonding," pages 150–166, 1949, vol. 5.